United States Patent
Fukuta

(10) Patent No.: US 9,900,898 B2
(45) Date of Patent: Feb. 20, 2018

(54) USER TERMINAL AND PROCESSOR FOR TRANSMITTING UE EUTRA CAPABILITY INFORMATION

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/623,979

(22) Filed: Jun. 15, 2017

(65) Prior Publication Data

US 2017/0290025 A1 Oct. 5, 2017

Related U.S. Application Data

(63) Continuation of application No. 14/768,414, filed as application No. PCT/JP2014/053195 on Feb. 12, 2014, now Pat. No. 9,686,728.

(Continued)

(51) Int. Cl.
*H04W 36/00* (2009.01)
*H04W 72/08* (2009.01)
(Continued)

(52) U.S. Cl.
CPC ......... *H04W 72/085* (2013.01); *H04W 8/005* (2013.01); *H04W 24/08* (2013.01);
(Continued)

(58) Field of Classification Search
None
See application file for complete search history.

(56) References Cited

U.S. PATENT DOCUMENTS

2009/0011770 A1 1/2009 Jung et al.
2010/0093364 A1 4/2010 Ribeiro et al.
(Continued)

FOREIGN PATENT DOCUMENTS

JP 2009-017560 A 1/2009
WO 2005/053347 A1 6/2005
(Continued)

OTHER PUBLICATIONS

3rd Generation Partnership Project; Technical Specification Group Services and System Aspects; Feasibility study for Proximity Services (ProSe) (Release 12), 3GPP TR 22.803 v12.0.0 (Dec. 2012).
(Continued)

*Primary Examiner* — Idowu O Osifade
(74) *Attorney, Agent, or Firm* — Studebaker & Brackett PC

(57) ABSTRACT

A mobile communication system is a mobile communication system that supports D2D communication that is direct device-to-device communication, and includes a user terminal configured to establish a radio connection with a base station, where the user terminal transmits terminal measurement information indicating information obtained by measurement of the user terminal, to the base station, and a network including the base station instructs the user terminal to start the D2D communication, when it is determined on the basis of the terminal measurement information that interference to the base station does not exceed a permissive amount when the user terminal performs the D2D communication.

3 Claims, 11 Drawing Sheets

Related U.S. Application Data

(60) Provisional application No. 61/766,461, filed on Feb. 19, 2013.

(51) Int. Cl.
*H04W 24/08* (2009.01)
*H04W 8/00* (2009.01)
*H04W 76/02* (2009.01)
*H04W 88/02* (2009.01)
*H04W 88/08* (2009.01)

(52) U.S. Cl.
CPC .......... *H04W 76/023* (2013.01); *H04W 88/02* (2013.01); *H04W 88/08* (2013.01)

(56) References Cited

U.S. PATENT DOCUMENTS

| | | |
|---|---|---|
| 2010/0165882 A1 | 7/2010 | Palanki et al. |
| 2010/0261469 A1 | 10/2010 | Ribeiro et al. |
| 2013/0064214 A1 | 3/2013 | Patil et al. |
| 2013/0287012 A1 | 10/2013 | Pragada et al. |
| 2013/0288608 A1 | 10/2013 | Fwu et al. |
| 2014/0153390 A1 | 6/2014 | Ishii et al. |

FOREIGN PATENT DOCUMENTS

| | | |
|---|---|---|
| WO | 2010/078273 A2 | 7/2010 |
| WO | 2011/116017 A1 | 9/2011 |

OTHER PUBLICATIONS

International Search Report for PCT/JP2014/053195 dated Mar. 25, 2014.
Written Opinion for PCT/JP2014/053195 dated Mar. 25, 2014.
Communication pursuant to Rule 164(1) EPC issued by the European Patent Office dated Aug. 24, 2016, which corresponds to European Patent Application No. 14754502.4-1854 and is related to U.S. Appl. No. 14/768,414.
Klaus Doppler et al.; "Device-to-Device Communication as an Underlay to LTE-Advanced Networks"; IEEE Communications Magazine; Dec. 2009; pp. 42-49; vol. 42; No. 12; US.
Klaus Doppler et al.; "Mode selection for Device-to-Device Communication to underlaying an LTE-Advanced Network"; Wireless Communications and Networking Conference (WCNC); Apr. 2010; pp. 1-6; IEEE; US.
Extended European Search Report (EESR) issued by the European Patent Office dated Feb. 7, 2017, which corresponds to European Patent Application No. 14754502.4-1854; 22pp.

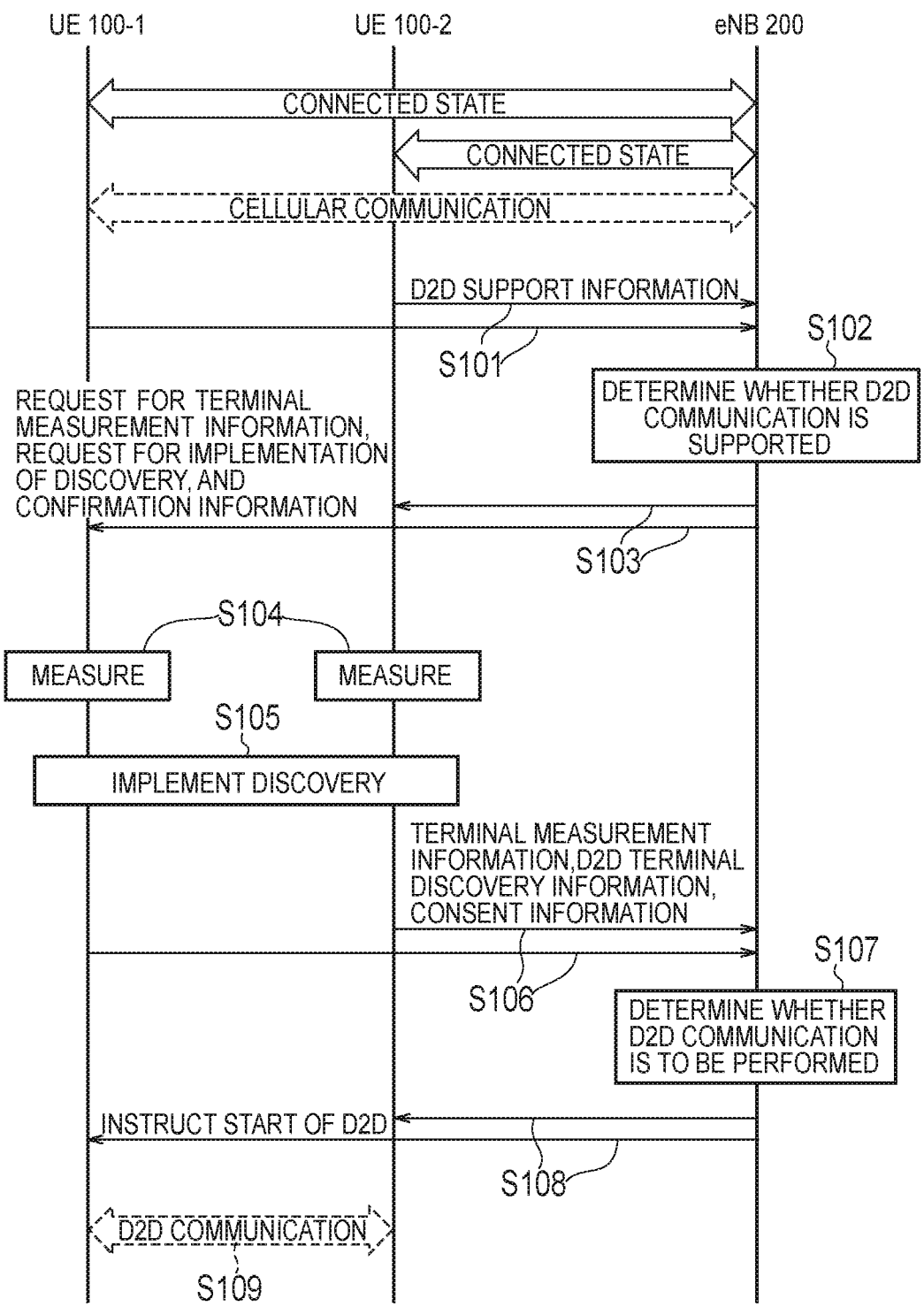

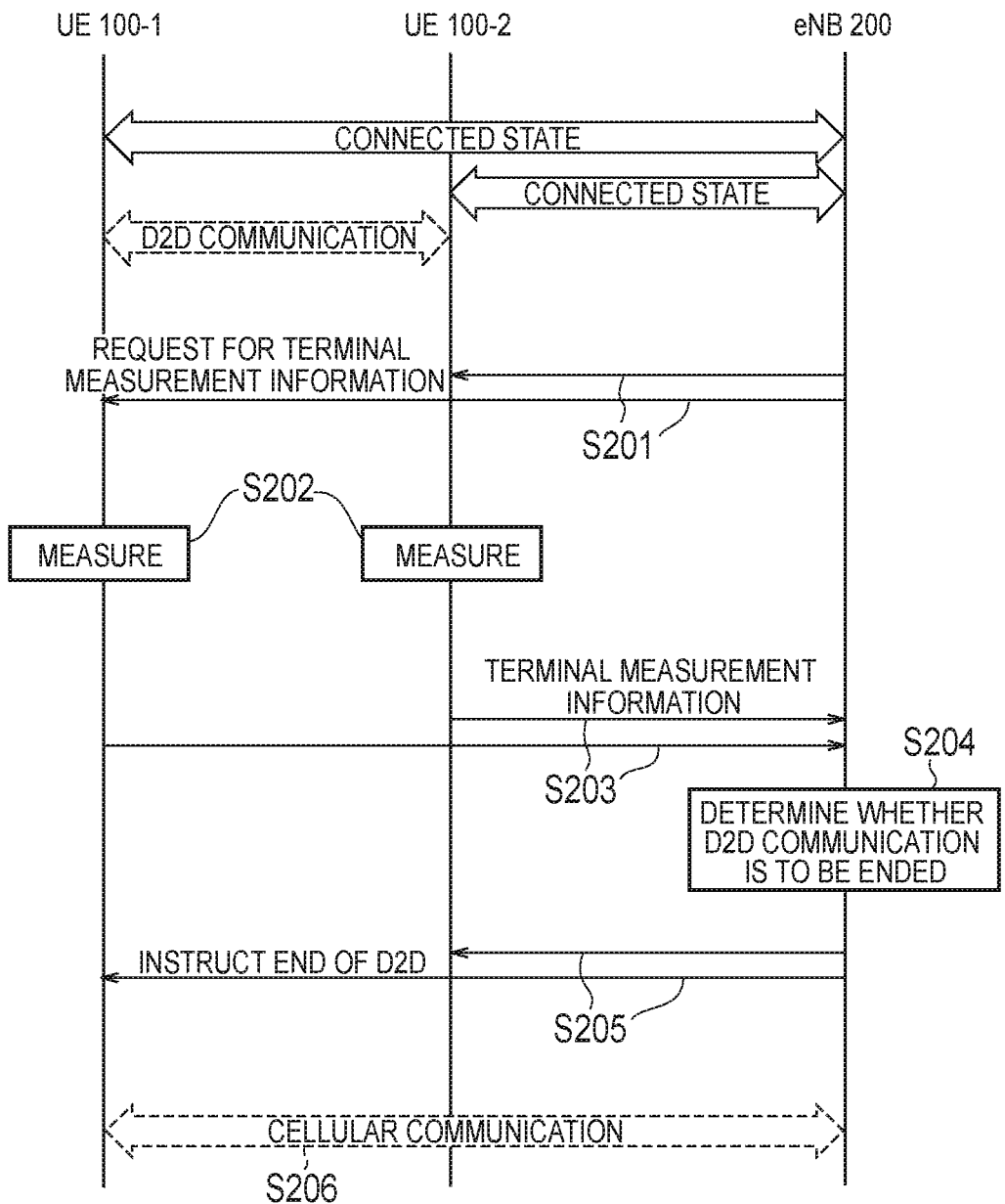

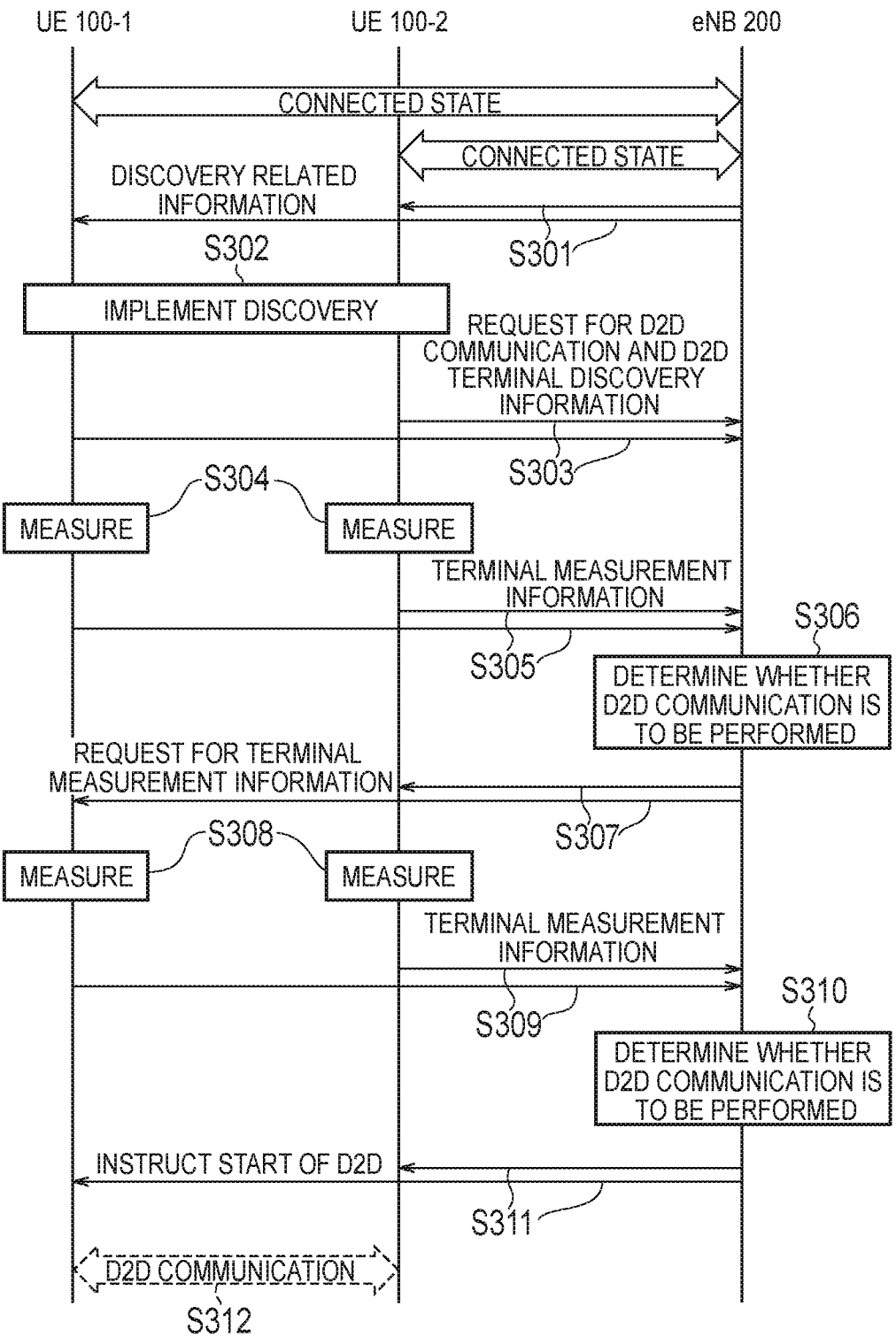

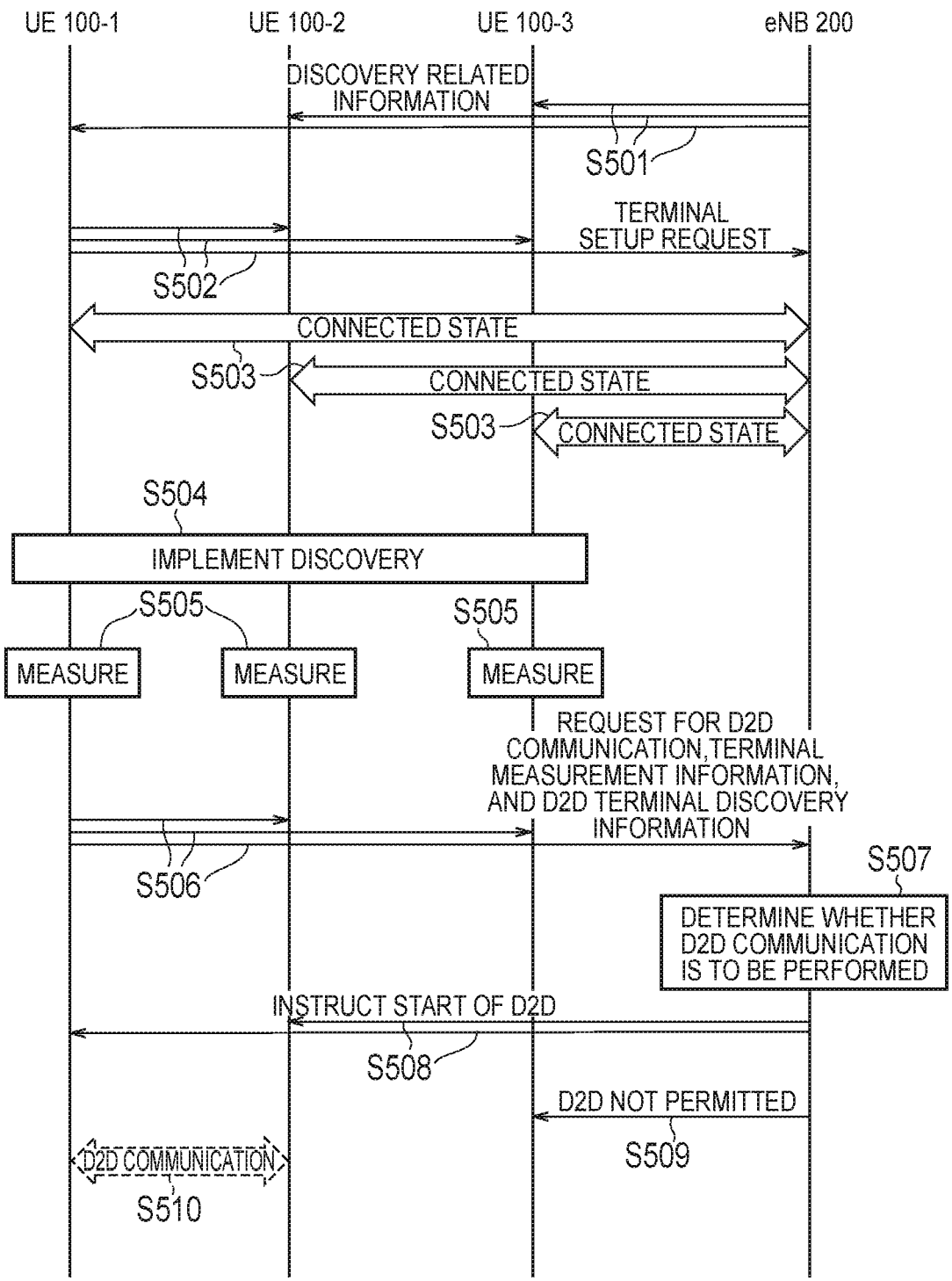

USER TERMINAL AND PROCESSOR FOR TRANSMITTING UE EUTRA CAPABILITY INFORMATION

CROSS REFERENCE TO RELATED APPLICATIONS

This application is a Continuation Application of U.S. patent application Ser. No. 14/768,414 filed Aug. 17, 2015, which is a National Stage Application of International Patent Application No. PCT/JP2014/053195 filed Feb. 12, 2014, which claims benefit of U.S. Provisional Application No. 61/766,461 filed Feb. 19, 2013, the entire contents of which are incorporated herein by reference.

TECHNICAL FIELD

The present disclosure relates to a mobile communication system that supports D2D communication, a base station, a user terminal, and a processor.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Document 1)

In the D2D communication, a plurality of neighboring user terminals perform direct radio communication in a frequency band assigned to a mobile communication system. In addition, the D2D communication is also called Proximity Service communication.

CITATION LIST

Non-Patent Document

Non Patent Document 1: 3GPP technical report "TR 22.803 V12.0.0" December 2012

SUMMARY

The current specifications have no mechanism for appropriately controlling the D2D communication. Thus, when the user terminal freely performs the D2D communication, the base station may receive interference caused by the transmission power of the user terminal in the D2D communication.

Therefore, the present disclosure provides a mobile communication system, a base station, a user terminal, and a processor, with which it is possible to restrain interference to a base station by a user terminal that performs D2D communication.

A communication system comprises a user terminal and a base station, wherein the user terminal transmits UE EUTRA capability information including information indicating an only uplink band on which the user terminal supports direct communication between terminals, to the base station, to enable the base station to determine, on the basis of the UE EUTRA capability information, whether the user terminal supports the direct communication, the user terminal receives, from the base station, information on radio resources to perform the direct communication, and the user terminal controls: starting the direct communication based on the received information on radio resources; measuring Reference Signal Received Power (RSRP) of a received signal from the base station during performing the direct communication; and ending the direct communication in response to the RSRP being higher than a predetermined value.

A user terminal comprises a transmitter, a receiver, and a controller, wherein the transmitter is configured to transmit UE EUTRA capability information including information indicating an only uplink band on which the user terminal supports direct communication between terminals, to a base station, to enable the base station to determine, on the basis of the UE EUTRA capability information, whether the user terminal supports the direct communication, the receiver is configured to receive, from the base station, information on radio resources to perform the direct communication, and the controller is configured to control: starting the direct communication based on the received information on radio resources; measuring Reference Signal Received Power (RSRP) of a received signal from the base station during performing the direct communication; and ending the direct communication in response to the RSRP being higher than a predetermined value.

A processor, communicatively coupled to a memory, is configured to control user terminal, wherein the processor executes processes of transmitting UE EUTRA capability information including information indicating an only uplink band on which the user terminal supports direct communication between terminals, to a base station, to enable the base station to determine, on the basis of the UE EUTRA capability information, whether the user terminal supports the direct communication; receiving, from the base station, information on radio resources to perform the direct communication; controlling starting the direct communication based on the received information on radio resources; controlling measuring Reference Signal Received Power (RSRP) of a received signal from the base station during performing the direct communication; and controlling ending the direct communication in response to the RSRP being higher than a predetermined value.

BRIEF DESCRIPTION OF THE DRAWINGS

FIG. 8 is a sequence diagram showing an operation example of the mobile communication system according to the first embodiment.
FIG. 10 is a sequence diagram showing an operation example of a mobile communication system according to a modification of the first embodiment.
FIG. 11 is a sequence diagram showing an operation example of a mobile communication system according to a second embodiment.

FIG. 13 is a sequence diagram showing an operation example of a mobile communication system according to a modification of the third embodiment.

DESCRIPTION OF THE EMBODIMENT

Overview of Embodiment

Figure 1:
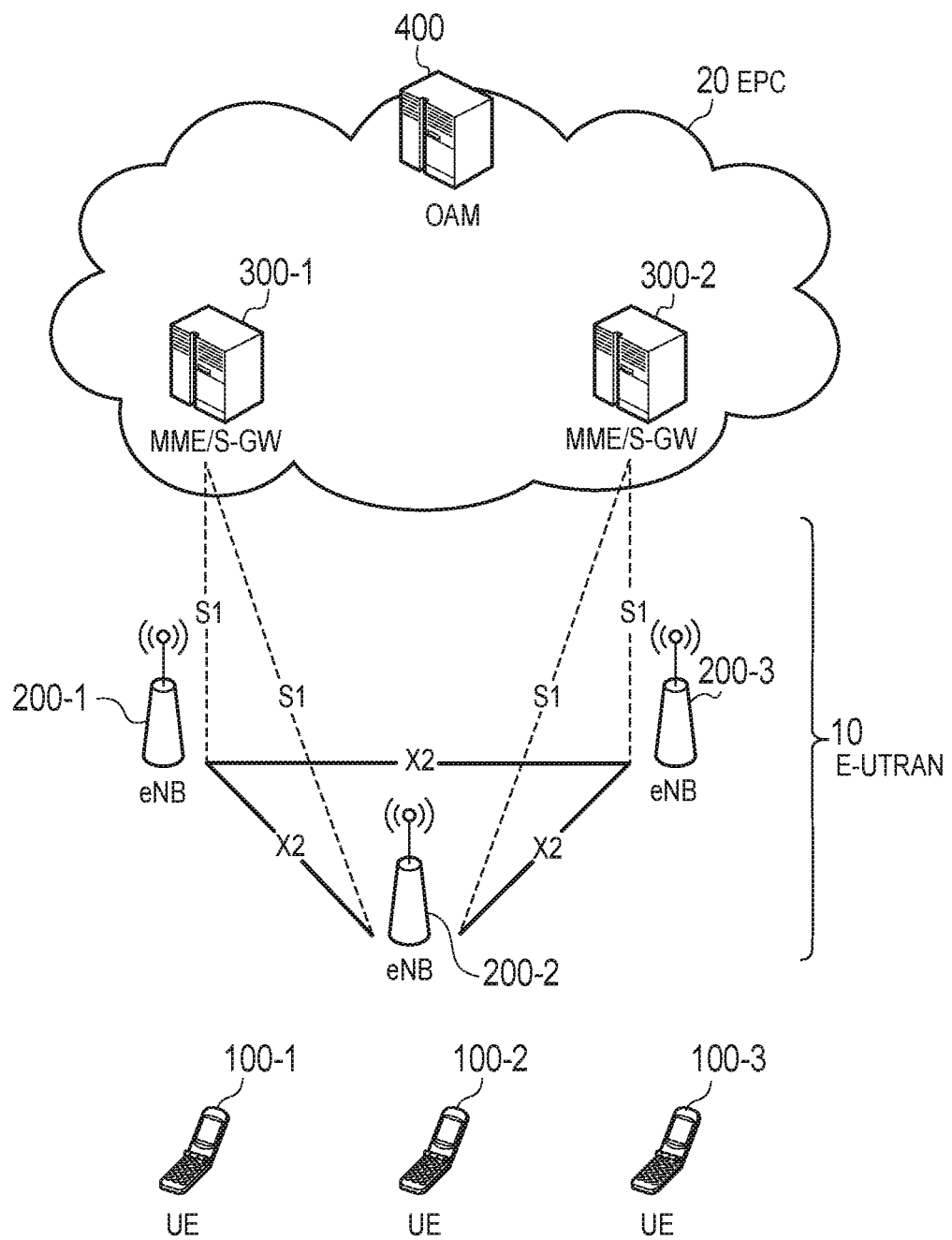
FIG. 1 is a configuration diagram of an LTE system.

A mobile communication system according to an embodiment is a mobile communication system that supports D2D communication that is direct device-to-device communication, and includes a user terminal configured to establish a radio connection with a base station, where the user terminal transmits terminal measurement information indicating information obtained by measurement of the user terminal, to the base station, and a network including the base station instructs the user terminal to start the D2D communication, when it is determined on the basis of the terminal measurement information that interference to the base station does not exceed a permissive amount when the user terminal performs the D2D communication. As a result, when the network determines that the interference to the base station exceeds the permissive amount when the user terminal performs the D2D communication, the user terminal does not start the D2D communication, and therefore, it is possible to restrain the base station from receiving interference from the D2D communication by the user terminal.

In a first embodiment, the terminal measurement information is location information indicating a location measured by the user terminal, and the network determines, on the basis of a distance that extends between the base station and the user terminal and that is evaluated from the location information, whether the interference to the base station does not exceed the permissive amount. As a result, the network is capable of making a determination irrespective of an accidental change in radio environment in a base station or a user terminal, and thus, it is possible to make a stable determination.

In a first embodiment, the terminal measurement information is radio environment information indicating a radio environment measured by the user terminal, and the network determines, on the basis at least one of a received power intensity that is received by the user terminal and that is evaluated from the radio environment information, and a pathloss between the base station and the user terminal, whether the interference to the base station does not exceed the permissive amount. As a result, the network is capable of making a determination on the basis of an actual radio environment of the user terminal, and thus, it is possible to improve the accuracy in determination.

In a first embodiment, the user terminal transmits D2D support information indicating whether the user terminal supports the D2D communication, the network determines, on the basis of the D2D support information, whether or not the user terminal supports the D2D communication, and the network does not instruct the user terminal to start the D2D communication, when the user terminal does not support the D2D communication. As a result, the network does not need to request, to the user terminal that does not support the D2D communication, unnecessary terminal measurement information for determining whether the D2D communication is to be performed by the user terminal.

In a first embodiment, when the network determines that the interference from the user terminal to the base station does not exceed the permissive amount and the user terminal performs communication with another user terminal by way of the network, the network instructs the user terminal and the other user terminal to start the D2D communication even when there is no request for the D2D communication from the user terminal and the other user terminal. As a result, the user terminal and the other user terminal perform the D2D communication, and thus, it is possible to reduce a load of traffic at the base station.

In a first embodiment, the network transmits confirmation information for confirming whether to consent to perform the D2D communication, to the user terminal, and the network instructs the user terminal and the other user terminal to start the D2D communication when there is the consent to perform the D2D communication from the user terminal. As a result, it is possible to restrain the network from forcedly performing the D2D communication by the user terminal against an intension of a user using the user terminal.

In a first embodiment, the network instructs the user terminal to start the D2D communication, when the D2D communication is performed only in a state where the user terminal establishes a radio connection with the base station. As a result, the network is capable of controlling the user terminal even when the user terminal performs the D2D communication.

In a first embodiment, another user terminal is provided which establishes a radio connection with the base station, the user terminal transmits the terminal measurement information to the base station, when the D2D communication is performed with the other user terminal in a state where a radio connection is established with the base station, and the network instructs the user terminal to end the D2D communication, when it is determined that interference to the base station exceeds the permissive amount when the user terminal performs the D2D communication on the basis of the terminal measurement information. As a result, the network not only controls the start of the D2D communication but also controls the end of the D2D communication, and thus, it is possible to further restrain the base station from receiving interference from the D2D communication by the user terminal.

In a first embodiment, the network instructs the user terminal to end the D2D communication, and instructs the user terminal to perform communication with the other user terminal by way of the network. As a result, the network is capable of restraining reception of interference from the user terminal, without ending the communication of the user terminal.

In a second embodiment, the user terminal is capable of transmitting a discovery-use signal used for discovering a communication partner terminal in the D2D communication, the base station transmits, to the user terminal, related information including at least one of: information of a radio resource used when the discovery-use signal is transmitted; and information of a transmission power, and the user terminal transmits the discovery-use signal corresponding to the related information. As a result, it is possible to restrain the discovery-use signal transmitted by the user terminal from becoming an interference signal to another user terminal existing in the vicinity of the user terminal.

In a third embodiment, when the radio connection between the user terminal and the base station is not established, the user terminal transmits information indicating establishment of a radio connection in order to perform only the D2D communication, together with a request for establishing the radio connection with the base station. As a result, it is possible to omit transmission and reception of information which is necessary for establishing a normal radio connection and which is not necessary in the establishment of a radio connection for performing only the D2D communication.

In the third embodiment, a mobile communication system that supports D2D communication that is direct device-to-device communication, comprising: three or more user terminals configured to establish a radio connection with a base station, wherein the plurality of user terminals each transmit, to the base station, terminal measurement information indicating information obtained by the user terminals each measuring, a network including the base station determines, on the basis of the terminal measurement information, whether or not interference to the base station is smaller than a permissive amount when each of the plurality of user terminals performs the D2D communication, and the network instructs only a user terminal determined to have the interference to the base station smaller than the permissive amount, out of the plurality of user terminals, to start the D2D communication. As a result, it is possible to effectively utilize the D2D communication and restrain the base station from receiving the interference from the D2D communication by the user terminal.

In an embodiment, a base station in a mobile communication system that supports D2D communication that is direct device-to-device communication, comprising: a control unit configured to instruct a user terminal to start the D2D communication, when a network including the base station determines, on the basis of terminal measurement information transmitted from the user terminal that establishes a radio connection with the base station, that interference to the base station does not exceed a permissive amount when the user terminal performs the D2D communication, wherein the terminal measurement information indicates information obtained by measurement by the user terminal.

In an embodiment, a user terminal in a mobile communication system that supports D2D communication that is direct device-to-device communication, comprising: a transmission unit configured to transmit, to a base station, D2D capability information indicating whether the user terminal has a capability of performing the D2D communication.

In an embodiment, a processor provided in a base station in a mobile communication system that supports D2D communication that is direct device-to-device communication, wherein the processor executes a process of instructing a user terminal to start the D2D communication, when a network including the base station determines, on the basis of terminal measurement information transmitted from a user terminal that establishes a radio connection with the base station, that interference to the base station does not exceed a permissive amount when the user terminal performs the D2D communication, and the terminal measurement information indicates information obtained by the user terminal.

In an embodiment, a processor provided in a user terminal in a mobile communication system that supports D2D communication that is direct device-to-device communication, wherein the user terminal executes a process of transmitting, to a base station, D2D capability information indicating whether the user terminal has a capability of performing the D2D communication.

Hereinafter, with reference to the accompanying drawings, the description will be provided for each embodiment when D2D communication is introduced to a cellular mobile communication system (hereinafter, an "LTE system") configured according to the 3GPP standards.

First Embodiment

Hereinafter, the first embodiment will be described.
(LTE System)
FIG. 1 is a configuration diagram of an LTE system according to the present embodiment.

As illustrated in FIG. 1, the LTE system includes a plurality of UEs (User Equipments) 100, E-UTRAN (Evolved-Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). Each eNB 200 corresponds to a base station. The eNB 200 manages a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a function of routing user data, and a measurement control function for mobility control and scheduling.

The EPC 20 includes MME (Mobility Management Entity)/S-GWs (Serving-Gateways) 300, and OAM (Operation and Maintenance) 400. Further, the EPC 20 corresponds to a core network.

The MME is a network node that performs various mobility controls and the like, for the UE 100 and corresponds to a controller. The S-GW is a network node that performs control to transfer user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
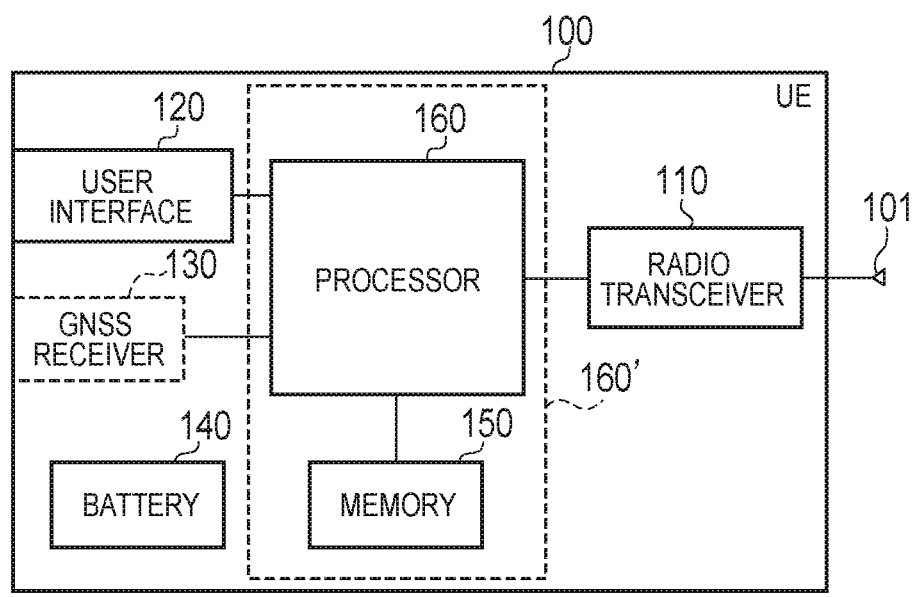
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
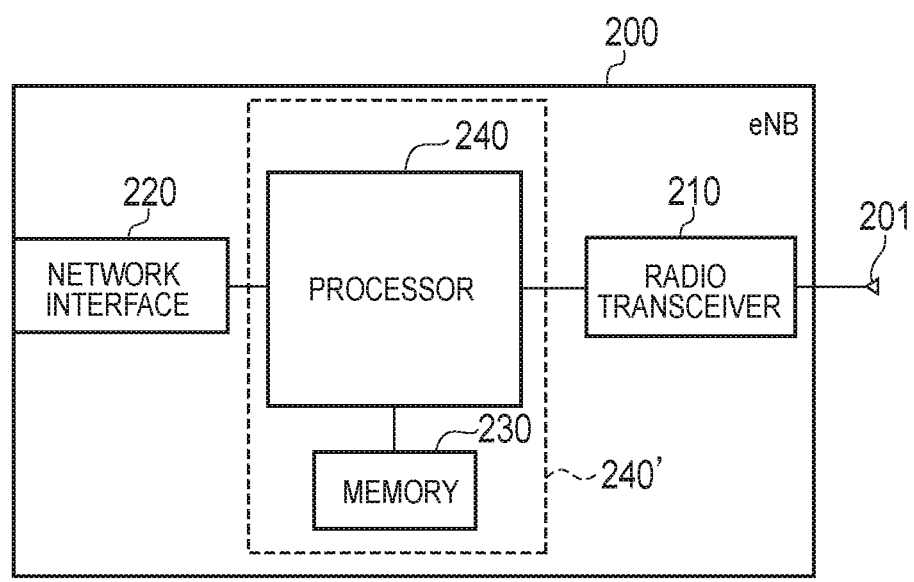
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. In addition, the memory 230 is integrated with the processor 240, and this set (that is, a chipset) may be called a processor 240'.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like on the baseband signal and a CPU that performs various processes by executing the program stored in the memory 230. The processor 240 executes various processes and various communication protocols described later.

Figure 4:
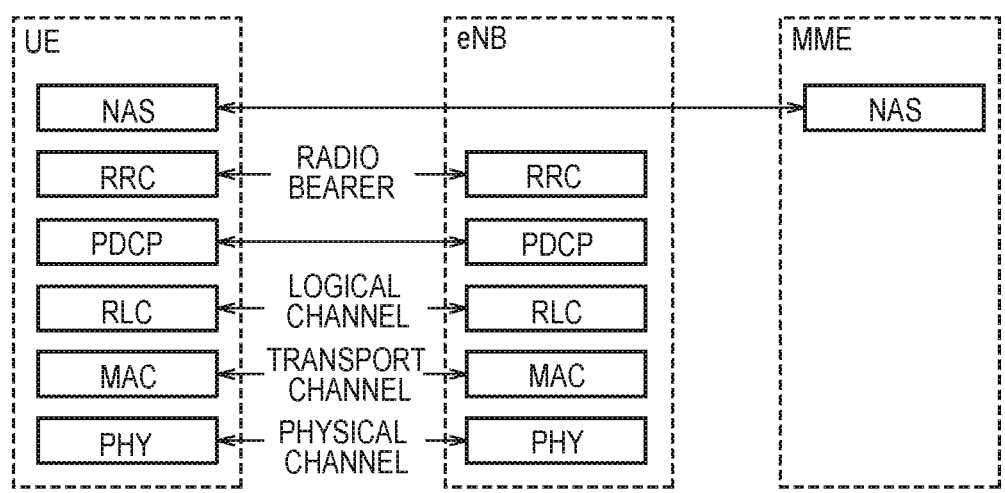
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a transport format of an uplink and a downlink (a transport block size, a modulation and coding scheme and the like) and a MAC scheduler to decide a resource block to be assigned.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management and mobility management, for example.

(D2D Communication)

Next, description will be provided by comparing the D2D communication with the normal communication (the cellular communication) in the LTE system.

Figure 5:
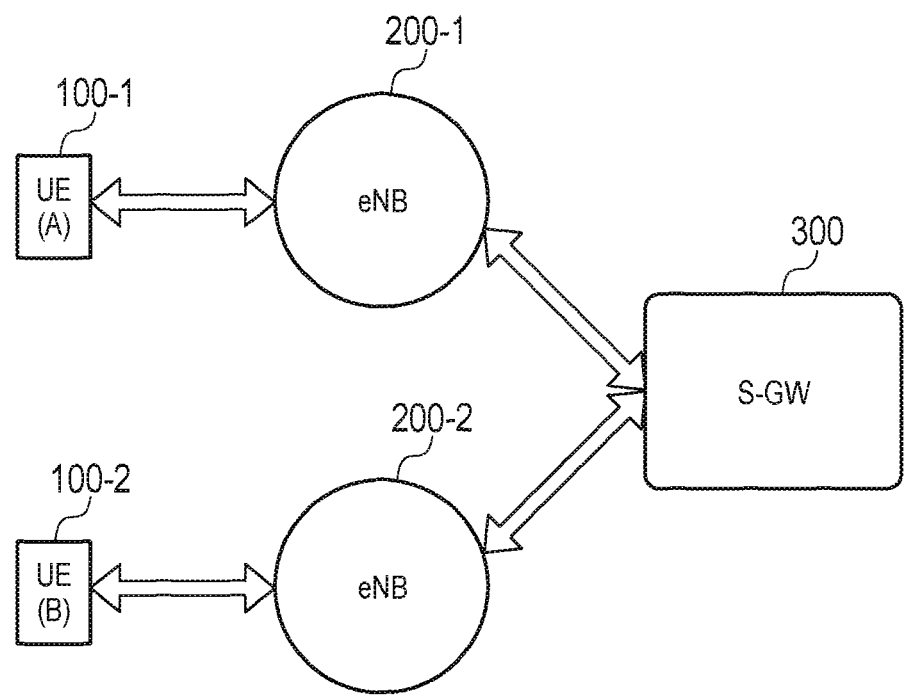
FIG. 5 is a diagram showing a data path in cellular communication.

FIG. 5 is a diagram illustrating a data path in the cellular communication. In this case, FIG. 5 illustrates the case in which the cellular communication is performed between UE 100-1 that establishes a connection with eNB 200-1 and UE 100-2 that establishes a connection with eNB 200-2. It is noted that the data path indicates a transfer path of user data (a user plane).

As illustrated in FIG. 5, the data path of the cellular communication passes through the network. Specifically, the data path is set to pass through the eNB 200-1, the S-GW 300, and the eNB 200-2.

Figure 6:
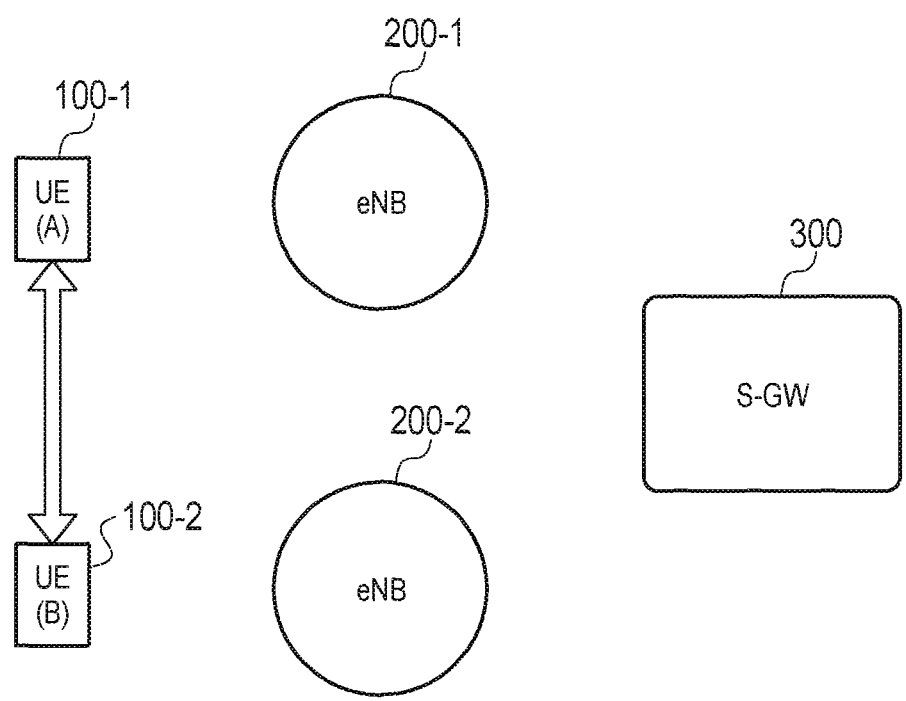
FIG. 6 is a diagram showing a data path in D2D communication.

FIG. 6 is a diagram illustrating a data path in the D2D communication. In this case, FIG. 6 illustrates the case in which the D2D communication is performed between the UE 100-1 that establishes a connection with the eNB 200-1 and the UE 100-2 that establishes a connection with the eNB 200-2.

As illustrated in FIG. 6, the data path of the D2D communication does not pass through the network. That is, direct radio communication is performed between the UEs. As described above, when the UE 100-2 exists in the vicinity of the UE 100-1, the D2D communication is performed between the UE 100-1 and the UE 100-2, thereby obtaining an effect that a traffic load of the network and a battery consumption amount of the UE 100 are reduced, for example. In addition, in a mode called Locally Routed (locally routed mode), a data path passes through the eNB 200 without passing through the S-GW 300.

It is noted that cases in which the D2D communication is started include (a) a case in which the D2D communication is started after a partner terminal is discovered by performing an operation for discovering a partner terminal (a proximal terminal), and (b) a case in which the D2D communication is started without performing an operation for discovering a partner terminal (a proximal terminal).

For example, in the above-described case (a), one UE 100 of the UE 100-1 and the UE 100-2 discovers the other UE 100 existing in the proximity of the one UE 100, so that the D2D communication is started.

In such a case, in order to discover a partner terminal, the UE 100 has a (Discover) function of discovering another UE (a proximal terminal) 100 existing in the proximity of the UE 100, and/or a (Discoverable) function of being discovered by another UE 100.

Specifically, the UE 100-1 transmits a discovery signal (Discovery signal/Discoverable signal) that is used to either discover a partner terminal (a proximal terminal) or to be discovered by a partner terminal (a proximal terminal). The UE 100-2 having received the discovery signal discovers the UE 100-1. When the UE 100-2 transmits a response to the discovery signal, the UE 100-1 having transmitted the discovery signal discovers the UE 100-2, which is the partner terminal.

It is noted that the UE 100 need not necessarily perform the D2D communication even upon discovering a partner terminal, for example, after mutually discovering each other, the UE 100-1 and the UE 100-2 may perform a negotiation, and determine whether or not to perform the D2D communication. When each of the UE 100-1 and the UE 100-2 agrees to perform the D2D communication, the D2D communication starts. It is noted that when the UE 100-1 does not perform the D2D communication after discovering a partner terminal, the UE 100-1 may report, to an upper layer (for example, an application), the discovery of the proximal UE 100 (that is, the UE 100-2). For example, the application is capable of executing a process based on the report (for example, a process of plotting the position of the UE 100-2 in the geographical information).

Moreover, the UE 100 is capable of reporting the discovery of a proximal terminal to the eNB 200, and is also capable of receiving, from the eNB 200, an instruction regarding whether to communicate with the partner terminal through the cellular communication or through the D2D communication.

On the other hand, in the above-described case (b), for example, the UE 100-1 starts the transmission (such as a notification through broadcasting) of a signal for the D2D communication without specifying a partner terminal. Thus, the UE 100 is capable of starting the D2D communication regardless of the existence of the discovery of a partner terminal. It is noted that the UE 100-2 that is performing the standby operation for the signal for the D2D communication performs synchronization or/and demodulation on the basis of the signal from the UE 100-1.

(Operation of Mobile Communication System According to First Embodiment)

Figure 7:
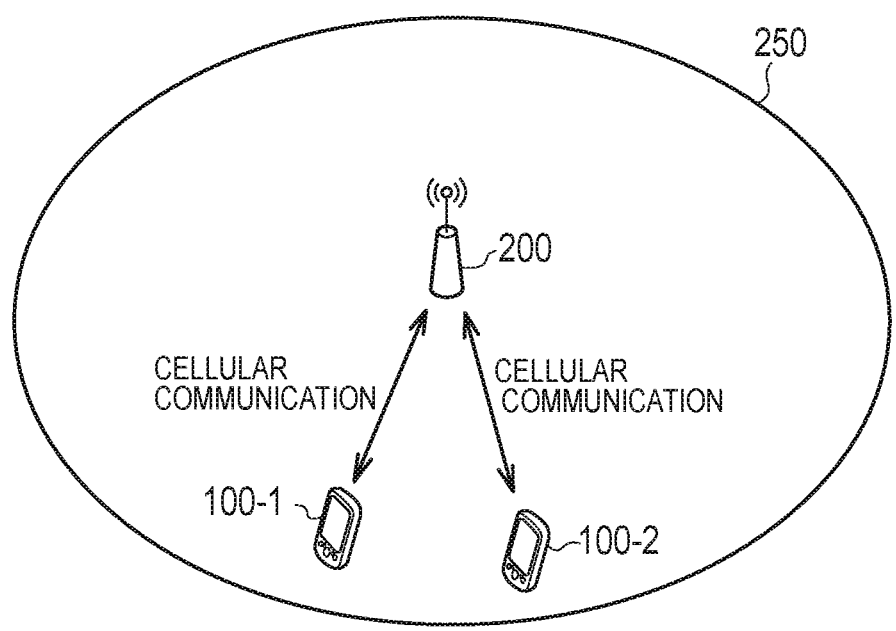
FIG. 7 is a diagram for explaining an operation of a mobile communication system according to a first embodiment.

Next, an operation of a mobile communication system according to a first embodiment will be described with reference to FIG. 7 to FIG. 9B. FIG. 7 is a diagram for explaining the operation of the mobile communication system according to the first embodiment. FIG. 8 is a sequence diagram illustrating an operation example of the mobile communication system according to the first embodiment.

As shown in FIG. 7, the UE 100-1 and the UE 100-2 exist in a cell 250 managed by the eNB 200. Further, as shown in FIG. 7 and FIG. 8, each of the UE 100-1 and the UE 100-2 establishes a connection with the eNB 200, and the UE 100-1 and the UE 100-2 perform cellular communication passing through a core network.

As shown in FIG. 8, in step 101, the UE 100-1 transmits D2D support information indicating whether the UE 100-1 supports the D2D communication, to the eNB 200. Likewise, the UE 100-2 transmits the D2D support information to the eNB 200. The eNB 200 receives the D2D support information.

Examples of the D2D support information include: (a) information indicating that the UE 100 supports the D2D communication using an uplink and a downlink in all the bands supporting the cellular communication (D2D capability); (b) information indicating that the UE 100 supports the D2D communication using the uplink and/or the downlink in all the bands supporting the cellular communication (D2D capability per UL/DL); (c) information indicating that the UE 100 supports the D2D communication using the uplink and the downlink in a predetermined band (D2D capability per band); (d) information indicating that the UE 100 supports the D2D communication using the uplink and/or the downlink in a predetermined band (D2D capability per band +UL/DL); and (e) information indicating that the UE 100 supports the D2D communication using the uplink and/or the downlink in a predetermined band of the uplink and/or a predetermined band of the downlink (D2D capability per UL/DL per band).

The D2D support information may be notified to the eNB 200 by using the UE Capability Information. For the D2D support information, a new FGI bit may be defined. Further, the D2D support information may be included in UE EUTRA Capability.

In step 102, the eNB 200 determines whether each of the UE 100-1 and the UE 100-2 supports the D2D communication. Specifically, the eNB 200 determines, on the basis of the D2D support information, whether or not each of the UE 100-1 and the UE 100-2 supports the D2D communication, in a band ensured by the eNB 200 for the D2D communication in the uplink and/or the downlink.

In step 103, the eNB 200 requests the terminal measurement information to each of the UE 100-1 and the UE 100-2. Each of the UE 100-1 and the UE 100-2 receives a terminal measurement information request. The terminal measurement information will be described in detail later.

Further, in the present embodiment, the eNB 200 requests the terminal measurement information, and requests that the UE 100-1 and the UE 100-2 implement Discovery.

Further, in the present embodiment, the eNB 200 requests the terminal measurement information, and transmits the confirmation information. Each of the UE 100-1 and the UE 100-2 receives the confirmation information.

The confirmation information is information for confirming the UE 100 whether or not to consent to perform the D2D communication. When receiving the confirmation information, each of the UE 100-1 and the UE 100-2 may display information indicating whether to consent to perform the D2D communication on a display included in a user interface 120.

In step 104, each of the UE 100-1 and the UE 100-2 implements measurement. Specifically, each of the UE 100-1 and the UE 100-2 measures at least one of a location and a radio environment.

When measuring the radio environment, the UE 100-1 measures a received power intensity (for example, RSRP) and/or reception quality (for example, RSRQ) of a signal received from the eNB 200. Further, the UE 100-1 measures the received power intensity and/or reception quality of a signal received from the UE 100-2, that is a partner terminal. Similarly to the UE 100-1, the UE 100-2 measures the radio environment.

In step 105, the UE 100-1 and the UE 100-2 implement Discovery. For example the UE 100-1 transmits a discovery-use signal used for discovering a communication partner terminal in the D2D communication (hereinafter, referred to as "Discovery signal"). When receiving the Discovery signal, the UE 100-2 transmits a response signal for the Discovery signal (Discovery response signal), to the UE 100-1. The UE 100-1 receives the Discovery response signal.

In step 106, each of the UE 100-1 and the UE 100-2 transmits the terminal measurement information. The eNB 200 receives the terminal measurement information.

The terminal measurement information indicates information obtained by measurement by the UE 100. Specifically, the terminal measurement information is information obtained by the measurement in the above-described step 104, and examples thereof include at least one of location information indicating the location of the UE 100 (detailed location information) and radio environment information indicting the radio environment of the UE 100.

The UE 100-1 transmits, as the terminal measurement information, the information measured in step 104. Further, the UE 100-1 may transmit, as the terminal measurement information, information (for example, pathloss information) obtained on the basis of the information measured in step 104. Similarly to the UE 100-1, the UE 100-2 transmits the terminal measurement information.

It is noted that the pathloss information is obtained by a difference between transmission power intensity included in a reference signal and a received power intensity of the reference signal, for example.

Each of the UE 100-1 and the UE 100-2 may regularly transmit the terminal measurement information in accordance with an instruction from the eNB 200. Alternatively, each of the UE 100-1 and the UE 100-2 may transmit the terminal measurement information by using a predetermined event, as a trigger, designated from the eNB 200. In the present embodiment, each of the UE 100-1 and the UE 100-2 transmits the terminal measurement information by using a request for the terminal measurement information, as a trigger.

In the present embodiment, each of the UE 100-1 and the UE 100-2 transmits, together with the terminal measurement information, D2D terminal discovery information. The eNB 200 receives the D2D terminal discovery information.

The D2D terminal discovery information is information indicating that the communication partner terminal in the D2D communication is discovered or cannot be discovered.

In the present embodiment, the UE 100-1 receives the Discovery response signal and the UE 100-2 receives the Discovery signal, and thus, each of the UE 100-1 and the UE 100-2 transmits, as the D2D terminal discovery information, information indicating that the communication partner terminal in the D2D communication is discovered.

It is noted that when the Discovery signal is transmitted and the Discovery response signal is not received for a predetermined time period, the UE 100-1 transmits information indicating that the communication partner terminal cannot be discovered. Further, when the Discovery signal is no received for a predetermined time period, the UE 100-2 transmits information indicating that the communication partner terminal cannot be discovered.

Further, each of the UE 100-1 and the UE 100-2 transmits the terminal measurement information, and transmits consent information indicating whether to consent to that the D2D communication is performed, to the eNB 200. Each of the UE 100-1 and the UE 100-2 may transmit the consent information to the eNB 200, only when the confirmation information is received from the eNB 200.

In step 107, the eNB 200 determines whether the UE 100-1 and the UE 100-2 are caused to perform the D2D communication. In the present embodiment, the eNB 200 performs (1) determination based on the terminal measurement information, (2) determination based on the D2D terminal discovery information, (3) determination based on the consent information, and (4) final determination.

(1) Determination Based on Terminal Measurement Information

The eNB 200 determines, on the basis of the terminal measurement information, whether the interference to the eNB 200 does not exceed the permissive amount, when each of the UE 100-1 and the UE 100-2 performs the D2D communication. A specific determination method will be described with reference to FIG. 9A and FIG. 9B.

Figure 9A:
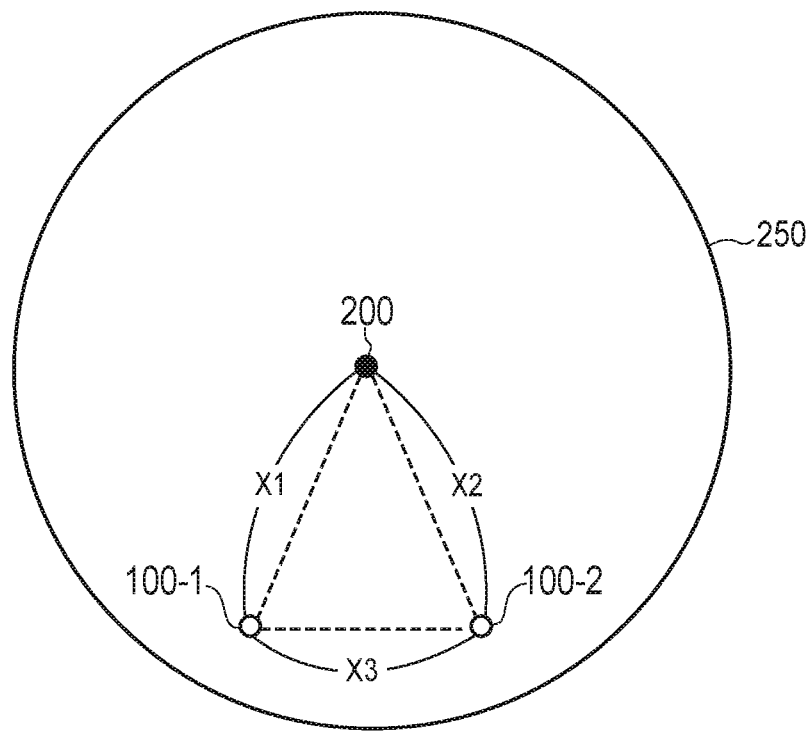
FIG. 9A is a diagram for explaining a distance between eNB 200; and UE 100-1 and the UE 100-2.
Figure 9B:
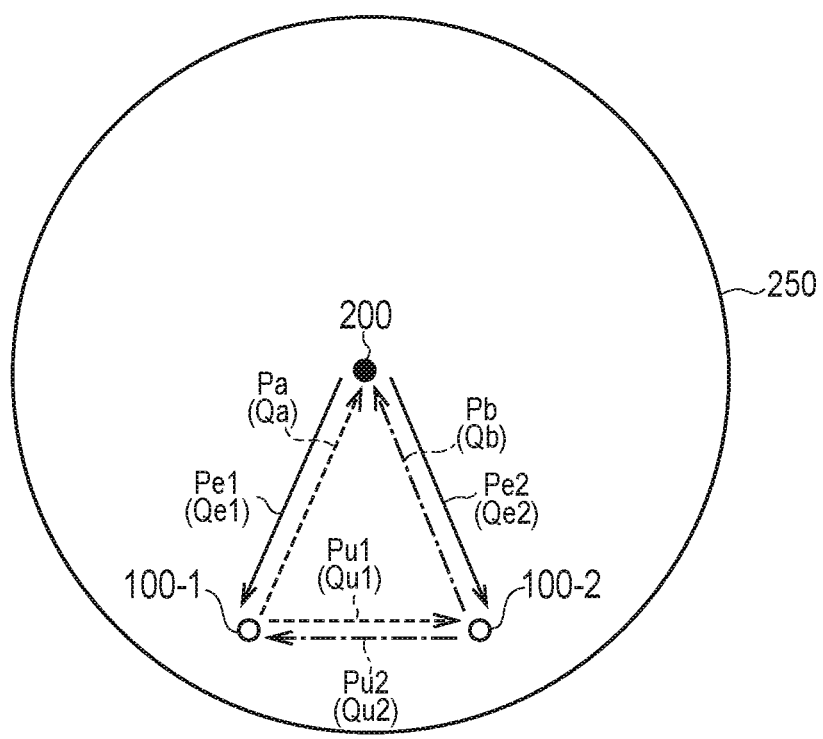
FIG. 9B is a diagram for explaining received power intensity and reception quality of a signal received by each of the eNB 200, the UE 100-1, and the UE 100-2.

FIG. 9A is a diagram for explaining a distance between the eNB 200; and the UE 100-1 and the UE 100-2. FIG. 9B is a diagram for explaining received power intensity and reception quality of a signal received by each of the eNB 200, the UE 100-1, and the UE 100-2.

The eNB 200 is capable of making a determination by the following determination methods, depending on a content of the terminal measurement information received from each of the UE 100-1 and the UE 100-2.

(A) Determination Method Based on Location Information (A1) Determination Method A1

When receiving the location information of the UE 100-1, the eNB 200 evaluates a distance X1 from the eNB 200 to the UE 100-1 on the basis of the location information of the eNB 200 and the location information of the UE 100-1.

The eNB 200 determines, on the basis of the distance X1, whether the interference from the UE 100-1 to the eNB 200 does not exceed the permissive amount. Specifically, when the distance X1 is equal to or more than a predetermined value, the eNB 200 determines that the interference from the UE 100-1 to the eNB 200 does not exceed the permissive amount, and when the distance X1 is less than the predetermined value, the eNB 200 determines that the interference from the UE 100-1 to the eNB 200 exceeds the permissive amount.

Further, when receiving the location information of the UE 100-2, the eNB 200 evaluates a distance X2 from the eNB 200 to the UE 100-2. Similarly to the above, the eNB 200 determines whether the interference from the UE 100-2 to the eNB 200 does not exceed the permissive amount.

(A2) Determination Method A2

When receiving the location information of each of the UE 100-1 and the UE 100-2, the eNB 200 evaluates a distance X3 from the UE 100-1 to the UE 100-2, in addition to the distance X1 and the distance X2.

The eNB 200 determines, on the basis of the distance X1 and the distance X3, whether the interference from the UE 100-1 to the eNB 200 does not exceed the permissive amount. Specifically, when the distance X1 is equal to or more than a value obtained by adding an offset value to the distance X3 (that is, when X1≥X3+offset value is satisfied), the eNB 200 determines that the interference from the UE 100-1 to the eNB 200 does not exceed the permissive amount, and when the distance X1 is less than a value obtained by adding an offset value to the distance X3 (that is, when X1<X3+offset value is satisfied), the eNB 200 determines that the interference from the UE 100-1 to the eNB 200 exceeds the permissive amount.

Further, similarly to the above, when the distance X2 is equal to or more than a value obtained by adding an offset value to the distance X3 (that is, when X2≥X3+offset value is satisfied), the eNB 200 determines that the interference from the UE 100-2 to the eNB 200 does not exceed the permissive amount, and when the distance X2 is less than a value obtained by adding an offset value to the distance X3 (that is, when X2<X3+offset value is satisfied), the eNB 200 determines that the interference from the UE 100-2 to the eNB 200 exceeds the permissive amount.

(B) Determination Method Based on Received Power Intensity (B1) Determination Method B1

When receiving information indicating a received power intensity Pe1 of the signal received by the UE 100-1 from the eNB 200, the eNB 200 determines, on the basis of the received power intensity Pe1, whether the interference from the UE 100-1 to the eNB 200 does not exceed the permissive amount.

Specifically, when the received power intensity Pe1 is smaller than a predetermined value, the eNB 200 determines that the interference from the UE 100-1 to the eNB 200 does not exceed the permissive amount, and when the received power intensity Pe1 is equal to or more than the predetermined value, the eNB 200 determines that the interference from the UE 100-1 to the eNB 200 exceeds the permissive amount.

Further, when receiving information indicating a received power intensity Pe2 of the signal received by the UE 100-2 from the eNB 200, the eNB 200 determines, similarly to the above, whether the interference from the UE 100-2 to the eNB 200 does not exceed the permissive amount.

(B2) Determination Method B2

When receiving information indicating a received power intensity Pu1 of the signal received by the UE 100-2 from the UE 100-1, the eNB 200 determines, on the basis of the received power intensity Pu1 and a received power intensity Pa of the signal received by the eNB 200 from the UE 100-1, whether the interference from the UE 100-1 to the eNB 200 does not exceed the permissive amount.

Specifically, when the received power intensity Pa is equal to or more than a value obtained by adding an offset value to the received power intensity Pu1 (that is, when Pa≥Pu1+offset value is satisfied), the eNB 200 determines that the interference from the UE 100-1 to the eNB 200 does not exceed the permissive amount, and when the received power intensity Pa is less than a value obtained by adding an offset value to the received power intensity Pu1 (that is, when Pa<Pu1+offset value is satisfied), the eNB 200 determines that the interference from the UE 100-1 to the eNB 200 exceeds the permissive amount.

Further, when receiving the received power intensity Pu2 of the signal received by the UE 100-1 from the UE 100-2, similarly to the above, the eNB 200 determines, on the basis of the received power intensity Pu2 and a received power intensity Pb of the signal received by the eNB 200 from the UE 100-1, whether the interference from the UE 100-2 to the eNB 200 does not exceed the permissive amount.

(C) Determination Method Based on Reception Quality (C1) Determination Method C1

When receiving information indicating reception quality Qe1 of the signal received by the UE 100-1 from the eNB 200, the eNB 200 determines, on the basis of the reception quality Qe1, whether the interference from the UE 100-1 to the eNB 200 does not exceed the permissive amount.

Specifically, when the reception quality Qe1 is smaller than a predetermined value, the eNB 200 determines that the interference from the UE 100-1 to the eNB 200 does not exceed the permissive amount, and when the reception quality Qe1 is equal to or more than the predetermined value, the eNB 200 determines that the interference from the UE 100-1 to the eNB 200 exceeds the permissive amount.

Further, when receiving information indicating reception quality Qe2 of the signal received by the UE 100-2 from the eNB 200, the eNB 200 determines, similarly to the above, whether the interference from the UE 100-2 to the eNB 200 does not exceed the permissive amount.

(C2) Determination Method C2

When receiving information indicating reception quality Qu1 of the signal received by the UE 100-2 from the UE 100-1, the eNB 200 determines, on the basis of the reception quality Qu1 and reception quality of the signal received by the eNB 200 from the UE 100-1, whether the interference from the UE 100-1 to the eNB 200 does not exceed the permissive amount.

Specifically, when the reception quality Qa is equal to or more than a value obtained by adding an offset value to the reception quality Qu1 (that is, when Qa≥Qu1+offset value is satisfied), the eNB 200 determines that the interference from the UE 100-1 to the eNB 200 does not exceed the permissive amount, and when the reception quality Qa is less than a value obtained by adding an offset value to the reception quality Qu1 (that is, when Qa<Qu1+offset value is satisfied), the eNB 200 determines that the interference from the UE 100-1 to the eNB 200 exceeds the permissive amount.

Further, when receiving reception quality Qu2 of the signal received by the UE 100-1 from the UE 100-2, the eNB 200 determines, similarly to the above, on the basis of the reception quality Qu2 and reception quality Qb of the signal received by the eNB 200 from the UE 100-1 whether the interference from the UE 100-2 to the eNB 200 does not exceed the permissive amount.

(D) Determination Method Based on Pathloss (D1) Determination Method D1

When receiving pathloss information between the eNB 200 and the UE 100-1, the eNB 200 determines, on the basis of the pathloss information, whether the interference from the UE 100-1 to the eNB 200 does not exceed the permissive amount.

It is noted that when receiving the information indicating the received power intensity Pe1 of the signal received by the UE 100-1 from the eNB 200, the eNB 200 may use a pathloss calculated from a difference between the transmission power intensity of the signal transmitted by the eNB 200 and the received power intensity Pe1.

Specifically, when the pathloss between the eNB 200 and the UE 100-1 is greater than a predetermined value, the eNB 200 determines that the interference from the UE 100-1 to the eNB 200 does not exceed the permissive amount, and when the received power intensity Pe1 is equal to or more than the predetermined value, the eNB 200 determines that the interference from the UE 100-1 to the eNB 200 exceeds the permissive amount.

Further, when receiving pathloss information between the eNB 200 and the UE 100-2, similarly to the above, the eNB 200 determines, on the basis of the pathloss information, whether the interference from the UE 100-2 to the eNB 200 does not exceed the permissive amount.

It is noted that when receiving the information indicating the received power intensity Pe2 of the signal received by the UE 100-2 from the eNB 200, the eNB 200 may use a calculated pathloss, similarly to the above.

(D2) Determination Method D2

When receiving the pathloss information between the UE 100-1 and the UE 100-2, the eNB 200 determines, on the basis of a pathloss PLu between the UE 100-1 and the UE 100-2 and a pathloss PLe1 between the eNB 200 and the UE 100-1, whether the interference from the UE 100-1 to the eNB 200 does not exceed the permissive amount.

Specifically, when the pathloss PLe1 is equal to or more than a value obtained by adding an offset value to the pathloss PLu (that is, when PLe1≥PLu+offset value is satisfied), the eNB 200 determines that the interference from the UE 100-1 to the eNB 200 does not exceed the permissive amount, and when the pathloss PLe1 is less than a value obtained by adding an offset value to the pathloss PLu (that is, when PLe1<PLu+offset value is satisfied), the eNB 200 determines that the interference from the UE 100-1 to the eNB 200 exceeds the permissive amount.

Further, similarly to the above, the eNB 200 determines, on the basis of the pathloss PLu between the UE 100-1 and the UE 100-2 and the pathloss PLe2 between the eNB 200 and the UE 100-2, whether the interference from the UE 100-1 to the eNB 200 does not exceed the permissive amount.

It is noted that when the eNB 200 determines whether the interference from the UE 100-1 to the eNB 200 does not exceed the permissive amount, it is preferable that a pathloss of the signal transmitted from the UE 100-1 to the UE 100-2 is used as the pathloss PLu between the UE 100-1 and the UE 100-2. Further, when the eNB 200 determines whether the interference from the UE 100-2 to the eNB 200 does not exceed the permissive amount, it is preferable that a pathloss of the signal transmitted from the UE 100-2 to the UE 100-1 is used as the pathloss PLu between the UE 100-1 and the UE 100-2.

When each of the UE 100-1 and the UE 100-2 performs the D2D communication by using at least one of the above-described determination methods, the eNB 200 determines whether the interference to the eNB 200 does not exceed the permissive amount.

When determining that the interference to the eNB 200 when the UE 100-1 and the UE 100-2 perform the D2D communication does not exceed the permissive amount, the eNB 200 determines that the UE 100-1 and the UE 100-2 are caused to perform the D2D communication. On the other hand, when determining that the interference to the eNB 200 when the UE 100-1 and the UE 100-2 perform the D2D communication exceeds the permissive amount, the eNB 200 determines that the UE 100-1 and the UE 100-2 are not caused to perform the D2D communication.

(2) Determination Based on D2D Terminal Discovery Information

Further, in the present embodiment, the eNB 200 determines, on the basis of the D2D terminal discovery information, whether the UE 100-1 and the UE 100-2 are caused to perform the D2D communication.

When at least one of the UE 100-1 and the UE 100-2 already discovers the communication partner terminal, the eNB 200 determines that the UE 100-1 and the UE 100-2 are caused to perform the D2D communication. On the other hand, when the UE 100-1 and the UE 100-2 do not discover the communication partner terminal, the eNB 200 determines that the UE 100-1 and the UE 100-2 are not caused to perform the D2D communication.

It is noted that in the present embodiment, the eNB 200 receives the information indicating that the communication partner terminal in the D2D communication is discovered, and thus, the eNB 200 determines that the UE 100-1 and the UE 100-2 are caused to perform the D2D communication.

(3) Determination Based on Consent Information

Further, in the present embodiment, the eNB 200 determines, on the basis of the consent information, whether the UE 100-1 and the UE 100-2 are caused to perform the D2D communication.

When each of the UE 100-1 and the UE 100-2 transmits the information indicating that each of the UE 100-1 and the UE 100-2 consents to the D2D communication, the eNB 200 determines that the UE 100-1 and the UE 100-2 are caused to perform the D2D communication. On the other hand, when each of the UE 100-1 and the UE 100-2 transmits the information indicating that at least one of the UE 100-1 and the UE 100-2 does not consent to the D2D communication, the eNB 200 determines that the UE 100-1 and the UE 100-2 are not caused to perform the D2D communication.

(4) Final Determination

When determining that the UE 100-1 and the UE 100-2 are caused to perform the D2D communication, the eNB 200 finally executes a process in step 108. Specifically, when determining that the UE 100-1 and the UE 100-2 are caused to perform the D2D communication in all of the above-described determinations (1) to (3), the eNB 200 executes the process in step 108.

In step 108, the eNB 200 instructs each of the UE 100-1 and the UE 100-2 to start the D2D communication. Each of the UE 100-1 and the UE 100-2 receives the instruction to start the D2D communication.

In the present embodiment, although not receiving the request for the D2D communication from each of the UE 100-1 and the UE 100-2, the eNB 200 instructs the start of the D2D communication. That is, when it is determined that the interference from each of the UE 100-1 and the UE 100-2 to the eNB 200 is smaller than the permissive amount and when the UE 100-1 and the UE 100-2 perform communication by way of the network, the eNB 200 instructs the start of the D2D communication even when there is no request for the D2D communication from each of the UE 100-1 and the UE 100-2. When each of the UE 100-1 and the UE 100-2 already consents to perform the D2D communication, the eNB 200 may instruct the start of the D2D communication.

It is noted that the eNB 200 may transmit, in addition to the instruction to start the D2D communication, information necessary for performing the D2D communication (for example, scheduling information indicating a radio resource assigned to the D2D communication between the UE 100-1 and the UE 100-2.

In step 109, the UE 100-1 and the UE 100-2 perform the D2D communication.

It is noted that the UE 100-1 and the UE 100-2 that receive the instruction to start the D2D communication perform negotiation of information used for establishing a D2D link. Information that is used for establishing the D2D link is the scheduling information, for example.

When the D2D link is established between the UE 100-1 and the UE 100-2, the UE 100-1 reports to the eNB 200-2 that the D2D link is established. The reported eNB 200-2 ends the cellular communication performed by the UE 100-1 and the UE 100-2.

(Operation of Mobile Communication System According to Modification of First Embodiment)

Next, with reference to FIG. 10, an operation of a mobile communication system according to a modification of the first embodiment will be described. It is noted that description will proceed on the basis mainly of a portion different from the above-described embodiment, and a similar portion will not be described, where necessary.

In the above-described first embodiment, a case where the UE 100-1 and the UE 100-2 start the D2D communication is described. In the present modification, a case where the UE 100-1 and the UE 100-2 end the D2D communication will be described.

FIG. 10 is a sequence diagram showing an operation example of the mobile communication system according to the modification of the first embodiment.

As shown in FIG. 10, each of the UE 100-1 and the UE 100-2 establishes a connection with the eNB 200, and the UE 100-1 and the UE 100-2 perform the D2D communication.

As shown in FIG. 10, in step 201, the eNB 200 requests the terminal measurement information to each of the UE 100-1 and the UE 100-2. Each of the UE 100-1 and the UE 100-2 receives the request for the terminal measurement information.

In step 202, each of the UE 100-1 and the UE 100-2 implements the measurement on the basis of the request for the terminal measurement information from the eNB 200.

In step 203, each of the UE 100-1 and the UE 100-2 transmits the terminal measurement information. The eNB 200 receives the terminal measurement information.

In step 204, the eNB 200 determines whether or not the UE 100-1 and the UE 100-2 are caused to end the D2D communication. That is, the eNB 200 determines whether or not the UE 100-1 and the UE 100-2 are caused to continue the D2D communication.

The eNB 200 determines, on the basis of the terminal measurement information, whether the interference to the eNB 200 does not exceed the permissive amount, when each of the UE 100-1 and the UE 100-2 is performing the D2D communication.

The eNB 200 determines whether the interference to the eNB 200 does not exceed the permissive amount according to the determination method similar to that in step 107 in the first embodiment.

When at least either one of the UE 100-1 or the UE 100-2 performs the D2D communication, if the eNB 200 determines that the interference to the eNB 200 exceeds the permissive amount, then a process in step 205 is executed.

When determining that the interference to the eNB 200 does not exceed the permissive amount when the UE 100-1 and the UE 100-2 perform the D2D communication, the eNB 200 may again execute the process in step 205.

In step 205, the eNB 200 instructs each of the UE 100-1 and the UE 100-2 to end the D2D communication. Each of the UE 100-1 and the UE 100-2 receives the instruction to end the D2D communication.

The eNB 200 instructs the end of the D2D communication, and gives an instruction to the UE 100-1 that the UE 100-1 communicates with the UE 100-2 byway of the eNB 200. Further, similarly, the eNB 200 instructs the end of the D2D communication, and gives an instruction to the UE 100-2 that the UE 100-2 communicates with the UE 100-1 by way of the eNB 200.

The eNB 200 releases the frequency band assigned to the D2D communication between the UE 100-1 and the UE 100-2, and forcedly stops the D2D communication.

In step 206, the UE 100-1 and the UE 100-2 perform the cellular communication.

(Summary of First Embodiment)

In the present embodiment, each of the UE 100-1 and the UE 100-2 transmits the terminal measurement information to the eNB 200, and when determining on the basis of the terminal measurement information that the interference to the eNB 200 does not exceed the permissive amount when each of the UE 100-1 and the UE 100-2 performs the D2D communication, the eNB 200 instructs each of the UE 100-1 and the UE 100-2 to start the D2D communication. As a result, when the eNB 200 determines that the interference to the eNB 200 exceeds the permissive amount when the UE 100-1 and the UE 100-2 perform the D2D communication, the UE 100-1 and the UE 100-2 does not start the D2D communication, and therefore, it is possible to restrain the eNB 200 from receiving interference from the D2D communication by the UE 100-1 and the UE 100-2.

In the present embodiment, the terminal measurement information is the location information, and the eNB 200 determines whether the interference to the eNB 200 does not exceed the permissive amount, on the basis of the distance, between the eNB 200 and the UE 100, evaluated from the location information. As a result, the eNB 200 is capable of making a determination irrespective of an accidental change in radio environment in the eNB 200 or the UE 100, and thus, it is possible to make a stable determination.

In the present embodiment, the terminal measurement information is the radio environment information, and the eNB 200 determines whether the interference to the eNB 200 does not exceed the permissive amount, on the basis at least one of the received power intensity that is evaluated from the radio environment information and that is received by the UE 100, and the pathloss between the eNB 200 and the UE 100. As a result, the eNB 200 is capable of making a determination on the basis of an actual radio environment of the UE 100, and thus, it is possible to improve the accuracy in the determination.

In the present embodiment, the UE 100 transmits the D2D support information, and on the basis of the D2D support information, the eNB 200 determines whether or not the UE 100 supports the D2D communication. As a result, it is possible for the eNB 200 to eliminate a need of requesting unnecessary terminal measurement information for determining whether the D2D communication is to be performed, to the UE 100 that does not support the D2D communication.

In the present embodiment, when it is determined that the interference from each of the UE 100-1 and the UE 100-2 to the eNB 200 is smaller than the permissive amount and when the UE 100-1 and the UE 100-2 perform communication by way of the network, the eNB 200 instructs the start of the D2D communication even when there is no request for the D2D communication from each of the UE 100-1 and the UE 100-2. As a result, the UE 100-1 and the UE 100-2 perform the D2D communication, and thus, it is possible to reduce a load of traffic at the eNB 200.

In the present embodiment, the eNB 200 transmits the confirmation information for confirming whether or not to consent to perform the D2D communication, to each of the UE 100-1 and the UE 100-2, and when receiving the consent to performing the D2D communication from each of the UE 100-1 and the UE 100-2, the eNB 200 instructs the UE 100-1 and the UE 100-2 to start the D2D communication. As a result, it is possible to restrain the eNB 200 from forcedly causing the UE 100-1 and the UE 100-2 to perform the D2D communication against the intention of each user using each of the UE 100-1 and the UE 100-2.

In the present embodiment, when the D2D communication is performed only in a state where each of the UE 100-1 and the UE 100-2 establishes the radio connection with the eNB 200, the eNB 200 may instruct each of the UE 100-1 and the UE 100-2 to start the D2D communication. As a result, even when the UE 100-1 and the UE 100-2 perform the D2D communication, the eNB 200 is capable of controlling the UE 100-1 and the UE 100-2.

In the present embodiment, when the D2D communication is performed in a state where the radio connection is established with the eNB 200, each of the UE 100-1 and the UE 100-2 transmits the terminal measurement information to the eNB 200, and when the eNB 200 determines on the basis of the terminal measurement information that the interference to the eNB 200 exceeds the permissive amount when the UE 100-1 and the UE 100-2 perform the D2D communication, the eNB 200 instructs each of the UE 100-1 and the UE 100-2 to end the D2D communication. As a result, the eNB 200 not only controls the start of the D2D communication but also controls the end of the D2D communication, and thus, it is possible to further restrain the eNB 200 from receiving interference from the D2D communication by the UE 100-1 and the UE 100-2.

In the present embodiment, the eNB 200 instructs the UE 100-1 and the UE 100-2 to end the D2D communication, and instructs the UE 100-1 and the UE 100-2 to perform the communication by way of the eNB 200. As a result, the eNB 200 is capable of restraining reception of interference from the UE 100-1 and the UE 100-2, without ending the communication of the UE 100-1 and the UE 100-2.

Second Embodiment (Operation of Mobile Communication System According to Second Embodiment)

Next, with reference to FIG. 11, an operation of a mobile communication system according to a second embodiment will be described. It is noted that description will proceed on the basis mainly of a portion different from the above-described embodiment and modification, and a similar portion will not be described, where necessary In the above-described first embodiment, a case is described where each of the UE 100-1 and the UE 100-2 does not give a request for the D2D communication, to the eNB 200. In the present embodiment, however, a case is described where each of the UE 100-1 and the UE 100-2 gives a request for the D2D communication to the eNB 200.

FIG. 11 is a sequence diagram showing an operation example of the mobile communication system according to the second embodiment.

As shown in FIG. 11, each of the UE 100-1 and the UE 100-2 establishes a connection with the eNB 200.

As shown in FIG. 11, in step 301, the eNB 200 transmits Discovery related information including information of the radio resource used when the Discovery signal is transmitted and/or information of the transmission power, to the UE 100-1 and the UE 100-2. Each of the UE 100-1 and the UE 100-2 receives the Discovery related information.

The Discovery related information is information including the information of the radio resource used when the Discovery signal is transmitted and/or the information of the transmission power. The information of the radio resource used when the Discovery signal is transmitted includes at least one item of information of a time resource and information of a frequency resource. It is noted that the eNB 200-1 selects the radio resource and the transmission power by which the Discovery signal will not act as an interference signal to the UE 100 connected to the cell 250 or/and the cell managed by a neighboring base station, and includes the selected radio resource and the transmission power into the Discovery related information.

In the present embodiment, the eNB 200 transmits the Discovery related information by broadcast. For example, the eNB 200 transmits the Discovery related information into a system information block (SIB). When the Discovery related information is included in the system information block (SIB), each of the UE 100-1 and the UE 100-2 is capable of receiving the Discovery related information even in an idle state. It is noted that the eNB 200 may transmit the Discovery related information by unicast.

In step 302, the UE 100-1 and the UE 100-2 implement the Discovery.

In the present embodiment, each of the UE 100-1 and the UE 100-2 transmits the Discovery signal corresponding to the Discovery related information. Specifically, the UE 100-1 (or the UE 100-2) decides the radio resource and the transmission power used when the Discovery signal is transmitted, on the basis of the information of the radio resource and/or the information of the transmission power included in the Discovery related information. Each of the UE 100-1 and the UE 100-2 starts transmitting the Discovery signal on the basis of the decided radio resource and transmission power.

In step 303, each of the UE 100-1 and the UE 100-2 transmits the request for the D2D communication and the D2D terminal discovery information. The eNB 200 receives the request for the D2D communication and the D2D terminal discovery information.

In step 304, each of the UE 100-1 and the UE 100-2 implements measurement.

In step 305, each of the UE 100-1 and the UE 100-2 transmits the terminal measurement information. The eNB 200 receives the terminal measurement information.

Further, in step 306, the eNB 200 determines, on the basis of the terminal measurement information, whether the UE 100-1 and the UE 100-2 are caused to perform the D2D communication.

In the present embodiment, description proceeds with an assumption of a case where when the UE 100-1 and the UE 100-2 perform the D2D communication, the eNB 200 is not capable of determining that the interference to the eNB 200 does not exceed the permissive amount. Examples of the case include: when the eNB 200 makes a determination according to a plurality of determination methods, determination results disagree depending on each determination method. Another case includes: although it is determined that the interference to the eNB 200, when one UE 100 (for example, the UE 100-1) performs the D2D communication, does not exceed the permissive amount, it is determined that the interference to the eNB 200 when the other UE 100 (for example, the UE 100-2) performs the D2D communication exceeds the permissive amount.

In step 307, the eNB 200 requests each of the UE 100-1 and the UE 100-2 that has transmitted the terminal measurement information to transmit the terminal measurement information. Each of the UE 100-1 and the UE 100-2 receives the request for the terminal measurement information.

The eNB 200 may explicitly request to transmit terminal measurement information (hereinafter, referred to as "new terminal measurement information") different from the terminal measurement information already transmitted by the UE 100 (hereinafter, referred to as "old terminal measurement information").

The new terminal measurement information may be information different in type from the old terminal measurement information, and may be information measured later than the time when the old terminal measurement information was measured.

In step 308, each of the UE 100-1 and the UE 100-2 implements measurement.

Each of the UE 100-1 and the UE 100-2 implements the measurement, triggered by the request for the terminal measurement information.

It is noted that when each of the UE 100-1 and the UE 100-2 performs the measurement after transmitting the old terminal measurement information to the eNB 200 and before receiving the request for the terminal measurement information, each of the UE 100-1 and the UE 100-2 is capable of transmitting the information acquired by the measurement as the new terminal measurement information, to the eNB 200, and thus, it is possible to omit the process in step 308.

In step 309, each of the UE 100-1 and the UE 100-2 transmits the terminal measurement information (new terminal measurement information). The eNB 200 receives the terminal measurement information.

In step 310, the eNB 200 determines, on the basis of the terminal measurement information (new terminal measurement information), whether the UE 100-1 and the UE 100-2 are caused to perform the D2D communication.

When determining on the basis of the new terminal measurement information that the interference to the eNB 200 does not exceed the permissive amount when the UE 100-1 and the UE 100-2 perform the D2D communication, the eNB 200 executes a process in step 311.

Step 311 and step 312 correspond to step 108 and step 109 in the first embodiment, respectively.

(Summary of Second Embodiment)

In the present embodiment, the eNB 200 transmits the Discovery related information including the information of the radio resource used when the Discovery signal is transmitted and/or the information of the transmission power, to the UE 100-1 and the UE 100-2, and the UE 100-1 transmits the Discovery signal corresponding to the Discovery related information. As a result, it is possible to restrain the Discovery signal transmitted by the UE 100-1 from becoming an interference signal to another UE 100 existing in the vicinity of the UE 100-1.

Third Embodiment (Operation of Mobile Communication System According to Third Embodiment)

Next, with reference to FIG. 12, an operation of a mobile communication system according to a third embodiment will be described. It is noted that description will proceed on the basis mainly of a portion different from the above-described embodiments and modifications, and a similar portion will not be described, where necessary In the above-described second embodiment, a case is described where each of the UE 100-1 and the UE 100-2 establishes a connection with the eNB 200. In the present embodiment, a case is described where each of the UE 100-1 and the UE 100-2 does not establish a connection with the eNB 200 at first.

Figure 12:
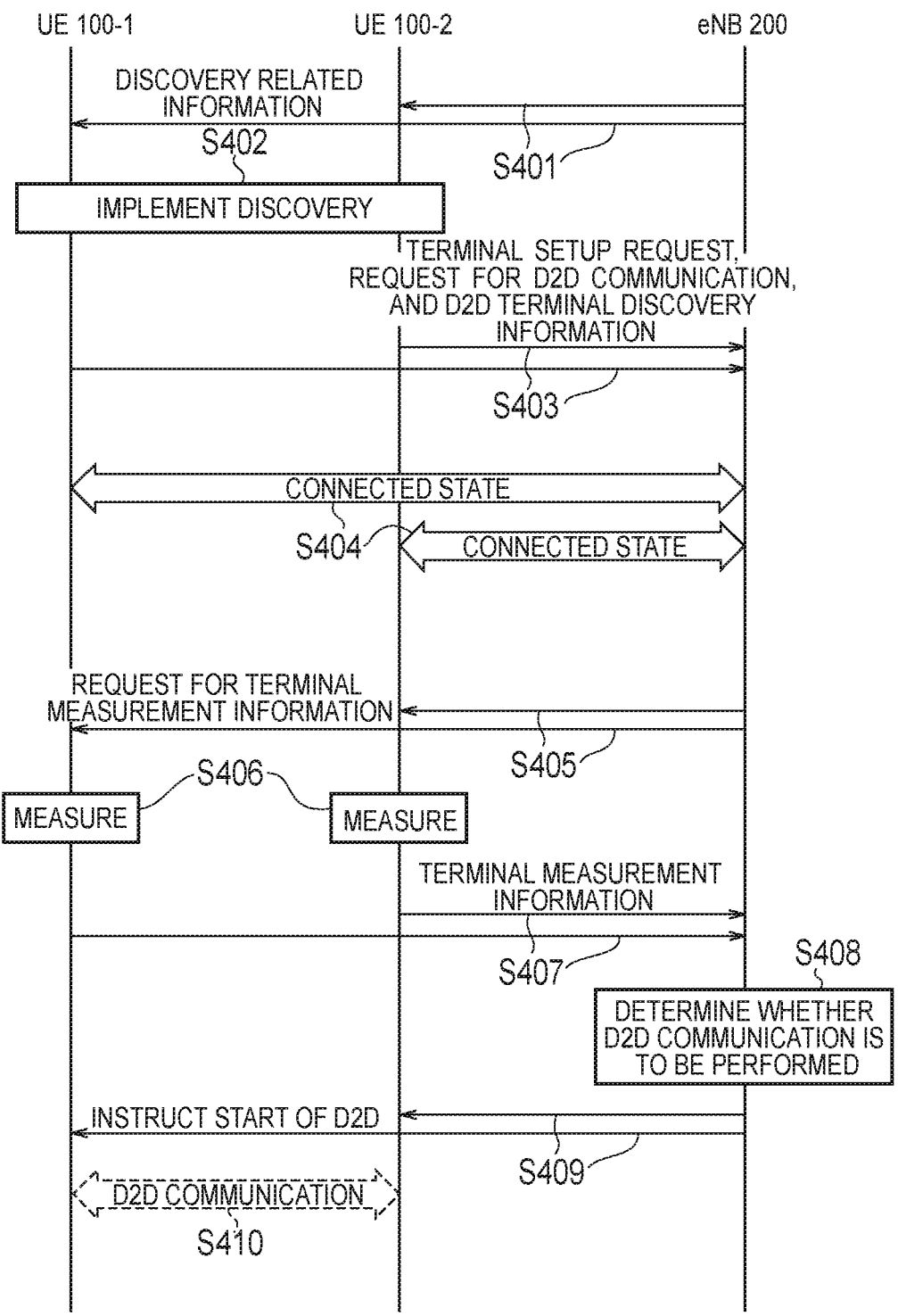
FIG. 12 is a sequence diagram showing an operation example of a mobile communication system according to a third embodiment.

FIG. 12 is a sequence diagram showing an operation example of the mobile communication system according to the third embodiment.

As shown in FIG. 12, each of the UE 100-1 and the UE 100-2 does not yet establish a connection with the eNB 200. That is, the UE 100-1 and the UE 100-2 are in an idle state.

As shown in FIG. 12, in step 401, the eNB 200 transmits the Discovery related information into the system information block. Each of the UE 100-1 and the UE 100-2 receives the Discovery related information.

In step 402, the UE 100-1 and the UE 100-2 implement the Discovery. In the present embodiment, the UE 100-1 (or the UE 100-2) transmits the Discovery signal corresponding to the Discovery related information.

In step 403, each of the UE 100-1 and the UE 100-2 requests a connection set-up to the eNB 200. Further, each of the UE 100-1 and the UE 100-2 transmits the request for the connection set-up, the request for the D2D communication, and the D2D terminal discovery information. The eNB 200 receives the request for the connection set-up, the request for the D2D communication, and the D2D terminal discovery information.

The eNB 200 that receives the request for the connection set-up performs a process for establishing the radio connection with each of the UE 100-1 and the UE 100-2.

In the present embodiment, each of the UE 100-1 and the UE 100-2 transmits the request for the connection set-up and information indicating the establishment of the radio connection in order to perform only the D2D communication.

In step 404, the radio connection between the eNB 200 and the UE 100-2 is established. Further, the radio connection between the eNB 200 and the UE 100-1 is established.

Step 405 to step 410 correspond to step 307 to step 312 in the second embodiment, respectively.

(Operation of Mobile Communication System According to Modification of Third Embodiment)

Next, with reference to FIG. 13, an operation of a mobile communication system according to a modification of the third embodiment will be described. It is noted that description will proceed on the basis mainly of a portion different from the above-described embodiment and modification, and a similar portion will not be described, where necessary In the above-described third embodiment, a case of the two UEs 100 (the UE 100-1 and the UE 100-2) is described. In the present modification, a case of three UEs 100 (the UE 100, the UE 100-2, and UE 100-3) will be described.

FIG. 13 is a sequence diagram showing an operation example of the mobile communication system according to the modification of the third embodiment.

As shown in FIG. 13, each of the UE 100-1, the UE 100-2, and the UE 100-3 does not yet establish a connection with the eNB 200.

As shown in FIG. 13, in step 501, the eNB 200 transmits the Discovery related information into the system information block. The UE 100-1, the UE 100-2, and the UE 100-3 receive the Discovery related information.

In step 502, each of the UE 100-1, the UE 100-2, and the UE 100-3 requests the connection set-up to the eNB 200. The eNB 200 that receives the request for the connection set-up performs a process for establishing the radio connection with each of the UE 100-1, the UE 100-2, and the UE 100-3.

In step 503, the radio connection between the eNB 200 and the UE 100 (the UE 100-1, the UE 100-2, and the UE 100-3) is established.

In step 504, the UE 100-1, the UE 100-2, and the UE 100-3 implement the Discovery.

In step 505, each of the UE 100-1, the UE 100-2, and the UE 100-3 implements the measurement.

In step 506, each of the UE 100-1, the UE 100-2, and the UE 100-3 transmits the request for the D2D communication, the terminal measurement information, and the D2D terminal discovery information. The eNB 200 receives the request for the D2D communication, the terminal measurement information, and the D2D terminal discovery information.

In step 507, the eNB 200 determines whether the UE 100-1, the UE 100-2, and the UE 100-3 are caused to perform the D2D communication.

In the present embodiment, description proceeds with an assumption of a case where the eNB 200 determines that the interference to the eNB 200 when the UE 100-1 and the UE 100-2 perform the D2D communication does not exceed the permissive amount, and determines that the interference to the eNB 200 when the UE 100-3 performs the D2D communication exceeds the permissive amount.

In step 508, the eNB 200 instructs each of the UE 100-1 and the UE 100-2 to start the D2D communication. That is, the eNB 200 instructs only the UE 100-1 and the UE 100-2 determined that the interference to the eNB 200 does not exceed the permissive amount to start the D2D communication.

Each of the UE 100-1 and the UE 100-2 receives the instruction to start the D2D communication.

In step 509, the eNB 200 transmits information indicating that the D2D communication is not permitted, to the UE 100-3. The UE 100-3 receives the information indicating that the D2D communication is not permitted.

In step 510, the UE 100-1 and the UE 100-2 perform the D2D communication.

It is noted that the eNB 200 may instruct the UE 100-3 to perform communication that passes through the core network (so-called cellular communication) with the UE 100-1 and the UE 100-2, and may instruct the UE 100-3 to communicate in a Locally Routed mode.

(Summary of Third Embodiment)

In the present embodiment, the information indicating that when the UE 100-1 and the UE 100-2 do not establish the radio connection with the eNB 200 and each of the UE 100-1 and the UE 100-2 establishes the radio connection in order to perform only the D2D communication is transmitted, together with the request for the connection set-up. As a result, it is possible to omit transmission and reception of information which is necessary for establishing a normal radio connection and which is not necessary in the establishment of a radio connection for performing only the D2D communication.

In the present embodiment, the eNB 200 instructs only the UE 100-1 and the UE 100-2 determined that the interference to the eNB 200 does not exceed the permissive amount to start the D2D communication, out of the UE 100-1, the UE 100-2, and the UE 100-3. As a result, it is possible to effectively utilize the D2D communication and restrain the eNB 200 from receiving the interference caused by the D2D communication.

Other Embodiments

Thus, the present disclosure has been described with the embodiments. However, it should not be understood that those descriptions and drawings constituting a part of this disclosure limit the present disclosure. From this disclosure, a variety of alternate embodiments, examples, and applicable techniques will become apparent to one skilled in the art.

In the above-described first embodiment, the eNB 200 requests the terminal measurement information and requests the UE 100-1 and the UE 100-2 to implement the Discovery; however, this is not limiting. The eNB 200 may request the implementation of the Discovery, separately of the request for the terminal measurement information. For example, when each of the UE 100-1 and the UE 100-2 performs the D2D communication, the eNB 200 may request the implementation of the Discovery after determining that the interference to the eNB 200 does not exceed the permissive amount. In this case, each of the UE 100-1 and the UE 100-2 transmits the terminal measurement information, and then, implements the Discovery after receiving the request for implementing the Discovery.

Further, in the above-described first embodiment, the eNB 200 transmits the request for the terminal measurement information and transmits the confirmation information; however, this is not limiting. The eNB 200 may transmit the confirmation information after receiving the terminal measurement information. That is, the eNB 200 may transmit the confirmation information to the UE 100, when determining that the UE 100-1 and the UE 100-2 are caused to perform the D2D communication. It is noted that the eNB 200 may not transmit the confirmation information.

Further, in the above-described first embodiment, each of the UE 100-1 and the UE 100-2 transmits the terminal measurement information and the D2D terminal discovery information; however, this is not limiting. Each of the UE 100-1 and the UE 100-2 may transmit the D2D terminal discovery information, separately of the request for the terminal measurement information.

Further, in the above-described first embodiment, each of the UE 100-1 and the UE 100-2 transmits the terminal measurement information and the consent information; however, this is not limiting. Each of the UE 100-1 and the UE 100-2 may transmit the consent information, separately of the request for the terminal measurement information.

It is noted that each of the UE 100-1 and the UE 100-2 may not transmit the consent information.

Further, in the above-described first embodiment, the eNB 200 determines whether the UE 100-1 and the UE 100-2 are caused to perform the D2D communication on the basis of the terminal measurement information, the D2D terminal discovery information, and the consent information; however, this is not limiting.

For example, the eNB 200 may omit the determination based on the consent information. Further, the eNB 200 may omit the determination based on the D2D terminal discovery information. That is, the eNB 200 may determine whether the UE 100-1 and the UE 100-2 are caused to perform the D2D communication on the basis only of the terminal measurement information. In this case, the eNB 200 may instruct the start of the D2D communication, and request the implementation of the Discovery.

Further, in the above-described second embodiment, the eNB 200 may not explicitly request the UE 100 to transmit the new terminal measurement information different from the old terminal measurement information. For example, the UE 100 may transmit the new terminal measurement information in a predetermined cycle, even when there is no explicit request from the eNB 200.

Further, in the above-described third embodiment, each of the UE 100-1 and the UE 100-2 transmits, in addition to the request for the connection set-up, the request for the D2D communication and the D2D terminal discovery information; however, this is not limiting. Each of the UE 100-1 and the UE 100-2 may individually transmit the request for the connection set-up, the request for the D2D communication, and the D2D terminal discovery information.

Further, in the modification of the above-described third embodiment, each of the UE 100-1, the UE 100-2, and the UE 100-3 transmits the request for the D2D communication, the terminal measurement information, and the D2D terminal discovery information; however, this is not limiting. Each of the UE 100-1, the UE 100-2, and the UE 100-3 may individually transmit the request for the D2D communication, the terminal measurement information, and the D2D terminal discovery information.

Further, in the above-described embodiments, the eNB 200 determines whether the UE 100-1 and the UE 100-2 are caused to perform the D2D communication; however, this is not limiting. Further, the eNB 200 determines whether each of the UE 100-1 and the UE 100-2 supports the D2D communication; however, this is not limiting. For example, MME/S-GW 300, that is an upper device of the eNB 200, may perform the determination.

Further, in the above-described embodiments, the eNB 200 may notify, by unicast or broadcast, the UE 100 of information to the effect that D2D communication under the control of the cell of the eNB 200 is permitted.

Further, in the above-described embodiments, the eNB 200 may instruct the UE 100 to start the D2D communication when the D2D communication is performed only in a state where the UE 100 establishes the radio connection (RRC connection) with the eNB 200. According thereto, as in the modification of the above-described first embodiment, when it is determined that the UE 100 that performs the D2D communication gives the interference to the eNB 200, the eNB 200 is capable of instructing the UE 100 that performs the D2D communication to end the D2D communication. The eNB 200 may notify the UE 100, by unicast or broadcast, of the UE 100 performing the D2D communication only in a state where the UE 100 establishes the radio connection with the eNB 200.

It is noted that exceptionally, when there is no UE 100 camping on the cell 250 managed by the eNB 200 or when the UE 100 needs to urgently perform the D2D communication, the eNB 200 may instruct the UE 100 to start the D2D communication without establishing the radio connection with the eNB 200.

Further, in the above-described embodiments, the UE 100 may transmit a measurement report as the terminal measurement information.

Further, in the above-described embodiments, when determining whether the interference to the eNB 200 does not exceed the permissive amount by using the above-described determination method A1, the eNB 200 may determine whether the interference from the UE 100 to the eNB 200 does not exceed the permissive amount on the basis only of the minimum distance, out of the distance X1 and the distance X2. Upon determination on the basis of the minimum distance when determining that the interference from the UE 100 to the eNB 200 does not exceed the permissive amount, the eNB 200 is capable of determining for all the UEs 100 that the interference to the eNB 200 does not exceed the permissive amount.

Further, in the above-described embodiments, when determining whether the interference from the UE 100 to the eNB 200 does not exceed the permissive amount, the eNB 200 may determine whether the interference from the UE 100 to the eNB 200 does not exceed the permissive amount on the basis not only of the pathloss information from the UE 100 to the eNB 200 but also of the terminal measurement information.

Further, in the above-described first embodiment, the eNB 200 transmits the request for the terminal measurement information and transmits the confirmation information; however, this is not limiting. The eNB 200 may transmit the confirmation information after receiving the terminal measurement information. That is, the eNB 200 may transmit the confirmation information to the UE 100, when determining that the UE 100-1 and the UE 100-2 are caused to perform the D2D communication.

Further, in the above-described embodiments, when determining that the interference to the eNB 200 exceeds the permissive amount in performing or being performing the D2D communication, the eNB 200 may notify, by unicast or broadcast, the UE 100 of the information indicating that the D2D communication is not permitted.

Naturally, each of the above-described embodiments and modifications may be combined, where necessary.

In the above-described embodiments, an example in which the present disclosure is applied to the LTE system has been described. However, the present disclosure may also be applied to systems, other than the LTE system, as well as the LTE system.

INDUSTRIAL APPLICABILITY

As described above, the mobile communication system, the base station, the user terminal, and the processor according to the present disclosure are able to restrain interference to a base station by a user terminal that performs D2D communication, and thus are useful for a mobile communication field.

The invention claimed is:
1. A communication system, comprising:
a user terminal; and
a base station, wherein
the user terminal transmits UE EUTRA capability information including information indicating an only uplink band on which the user terminal supports direct communication between terminals, to the base station, to enable the base station to determine, on the basis of the UE EUTRA capability information, whether the user terminal supports the direct communication,
the user terminal receives, from the base station, information on radio resources to perform the direct communication, and
the user terminal controls:
starting the direct communication based on the received information on radio resources;
measuring Reference Signal Received Power (RSRP) of a received signal from the base station during performing the direct communication; and
ending the direct communication in response to the RSRP being higher than a predetermined value.
2. A user terminal, comprising:
a transmitter;
a receiver; and
a controller; wherein
the transmitter is configured to transmit UE EUTRA capability information including information indicating an only uplink band on which the user terminal supports direct communication between terminals, to a base station, to enable the base station to determine, on the basis of the UE EUTRA capability information, whether the user terminal supports the direct communication,
the receiver is configured to receive, from the base station, information on radio resources to perform the direct communication, and
the controller is configured to control:
starting the direct communication based on the received information on radio resources;

measuring Reference Signal Received Power (RSRP) of a received signal from the base station during performing the direct communication; and ending the direct communication in response to the RSRP being higher than a predetermined value.

3. A processor, communicatively coupled to a memory, and configured to controlling for a user terminal, wherein the processor executes processes of:

transmitting UE EUTRA capability information including information indicating an only uplink band on which the user terminal supports direct communication between terminals, to a base station, to enable the base station to determine, on the basis of the UE EUTRA capability information, whether the user terminal supports the direct communication;

receiving, from the base station, information on radio resources to perform the direct communication;

controlling starting the direct communication based on the received information on radio resources;

controlling measuring Reference Signal Received Power (RSRP) of a received signal from the base station during performing the direct communication; and controlling ending the direct communication in response to the RSRP being higher than a predetermined value.

* * * * *